United States Patent
Dudziak et al.

(10) Patent No.: US 9,387,609 B2
(45) Date of Patent: Jul. 12, 2016

(54) METHOD OF PRODUCING A COMPOSITE COMPONENT

(75) Inventors: Kai-Uwe Dudziak, Stelle (DE); Juergen Falke, Rellingen (DE); Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 418 days.

(21) Appl. No.: 13/392,335

(22) PCT Filed: Jun. 30, 2010

(86) PCT No.: PCT/EP2010/003961
§ 371 (c)(1),
(2), (4) Date: Mar. 30, 2012

(87) PCT Pub. No.: WO2011/023258
PCT Pub. Date: Mar. 3, 2011

(65) Prior Publication Data
US 2012/0181731 A1   Jul. 19, 2012

(30) Foreign Application Priority Data
Aug. 27, 2009 (DE) .......................... 10 2009 039 081

(51) Int. Cl.
*B29C 45/14* (2006.01)
*B29L 31/30* (2006.01)

(52) U.S. Cl.
CPC ... *B29C 45/1418* (2013.01); *B29C 2045/14213* (2013.01); *B29L 2031/3002* (2013.01)

(58) Field of Classification Search
CPC .... B29C 45/14; B29C 45/1418; B29C 51/12; B29C 45/0046; B29C 45/0053; B29C 45/0055; B29C 2045/0087; B29C 2045/14213; B21D 26/02; B29L 2031/3002
USPC ............... 72/54, 56, 58, 61, 370.22; 264/259, 264/510, 513; 29/421.1, 527.1
See application file for complete search history.

(56) References Cited

U.S. PATENT DOCUMENTS

| | | | | |
|---|---|---|---|---|
| 4,101,617 | A * | 7/1978 | Friederich | 264/572 |
| 5,023,041 | A * | 6/1991 | Jones et al. | 264/510 |
| 5,928,677 | A * | 7/1999 | Gosdin | 425/130 |
| 6,216,509 | B1 * | 4/2001 | Lotspaih et al. | 72/61 |

(Continued)

FOREIGN PATENT DOCUMENTS

WO   WO 2008/067901 A1   6/2008
WO   WO 2008067901 A1 *   6/2008

(Continued)

OTHER PUBLICATIONS

PCT/ISA/237 Form (Six (6) pages).

(Continued)

*Primary Examiner* — Shelley Self
*Assistant Examiner* — Gregory Swiatocha
(74) *Attorney, Agent, or Firm* — Crowell & Moring LLP

(57) ABSTRACT

A method of producing a composite component, in which a hollow section is expanded, at least in regions, by internal high pressure. In a first step a region of the hollow section is expanded until it comes to lie against an edge region of a cavity of a combined hydroforming and injection mold. In a second step the cavity is filled with an injection molding compound. In a third step the hollow section, at least in regions, is expanded further, which increases the internal high pressure.

18 Claims, 2 Drawing Sheets

(56) References Cited

U.S. PATENT DOCUMENTS

Figure 1:
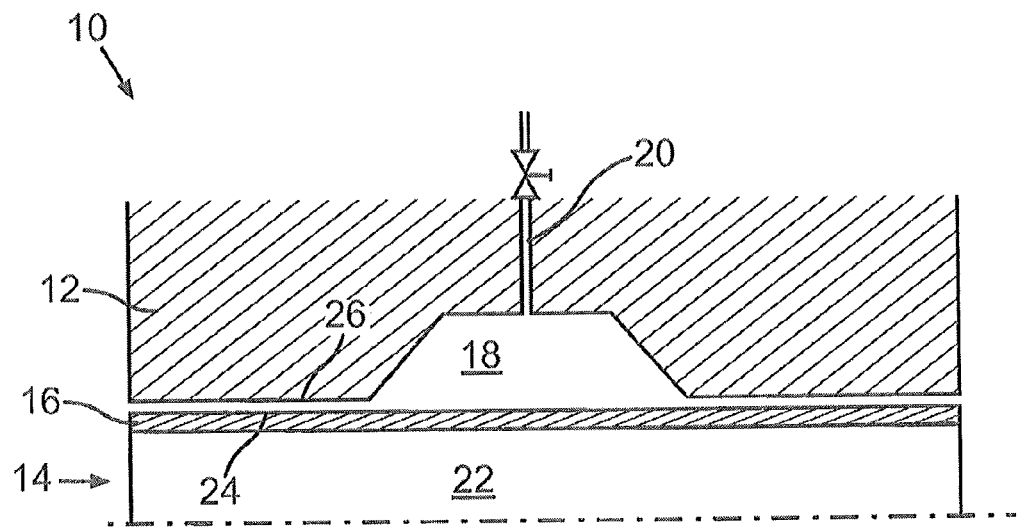

| | | | |
|---|---|---|---|
| 7,146,700 B1* | 12/2006 | Darrah et al. | 29/419.2 |
| 2002/0153631 A1* | 10/2002 | Eckardt et al. | 264/40.3 |
| 2005/0001354 A1* | 1/2005 | Klocke | 264/279 |
| 2007/0138664 A1* | 6/2007 | Chen et al. | 264/1.32 |
| 2009/0200706 A1* | 8/2009 | Bessac et al. | 264/279 |
| 2010/0072678 A1* | 3/2010 | Augustin et al. | 264/526 |
| 2011/0175257 A1* | 7/2011 | Huber et al. | 264/328.16 |

FOREIGN PATENT DOCUMENTS

| | | | |
|---|---|---|---|
| WO | WO 2008/125233 A1 | 10/2008 | |
| WO | WO 2008125233 A1 * | 10/2008 | B29C 45/1418 |
| WO | WO 2009/077026 A1 | 6/2009 | |

OTHER PUBLICATIONS

International Search Report including English translation dated Nov. 22, 2010 (Ten (10) pages).

* cited by examiner

METHOD OF PRODUCING A COMPOSITE COMPONENT

BACKGROUND AND SUMMARY OF THE INVENTION

The invention relates to a method of producing a composite component.

PCT International Publication No. WO 2008/125233 A1 discloses a method of producing a composite component in which a hollow section is expanded by internal high pressure and is simultaneously encapsulated with plastics material in a bulge region. The simultaneous expansion and encapsulation is intended to produce an improved positive lock.

With polymer hybrid components that are known per se, which are designed as a combination of an injection molded component and a hydroformed metal component, the composite adhesion between the two component parts of the component is brought about by an adhesion promoter or by a positive lock between the two components. The fixing of the two components relative to each other is, however, often inadequate despite these measures. Particularly in the case of hybrid components connected in positive manner, it is often not possible to produce a positive lock providing sufficient holding.

Exemplary embodiments of the present invention provide a method of producing a composite component that improves the composite adhesion in a composite component consisting of a hollow section which is expanded by internal high pressure and a plastics material portion.

With such a method, in a first step a region of a hollow section is expanded until it comes to lie against an edge region of a cavity of a combined hydroforming and injection mold. In a second step of the method, this still free cavity is filled with an injection molding compound. According to the invention, in a third step the hollow section, at least in regions, is expanded further, increasing the internal high pressure. Upon this expansion, a free form is produced, the shape of which depends on the pressure difference between the internal high pressure and the injection molding pressure, and also the temperature of the injection molding and the shear stresses triggered by the injected plastics material by flow contact on the surface of the hollow section. Due to the free form, particularly large undercuts are obtained, so that the molded on plastics material can clamp particularly well to the hollow section and thus achieves completely non-slip, non-detachable holding on the hollow section, and therefore the composite adhesion is considerably improved. Additional means providing holding, such as adhesives or other adhesion promoters and also mechanically acting fastening elements, can be dispensed with.

At the same time, owing to the temperature of the injection molding compound and the shear stresses acting on the hollow section during the third step due to the pasty or liquid injection molding compound, which result in an increase in the flow limit of the hollow section material, particularly high degrees of deformation can be achieved.

In a further embodiment of the invention, the injection molding compound is fed into the cavity preferably at a temperature of 200° C. to 400° C. The hollow section, which may advantageously be aluminum for the purpose of lightweight construction, likewise assumes this temperature. Since the material aluminum has a greater deformability in this temperature range, far higher degrees of deformation can be achieved when shaping these aluminum hollow sections. Advantageously, during the third step of the method in addition a specified pressure difference between the internal high pressure and a pressure of the injection molding compound is set, in order thus to control particularly well the shear stresses in the hollow section which is to be shaped and thus likewise to have a positive influence on the flow behavior of the material of the hollow section.

During the expansion of the hollow section in the third step of the method, furthermore preferably a valve, for example in the form of a needle valve, of at least one exit channel of the cavity is opened, so that injection molding compound displaced by the expansion of the hollow section can emerge from the cavity. This ensures that during the additional expansion in the third step of the method the excess injection molding compound does not result in uncontrolled over-encapsulation on the component.

Furthermore, the location and the number of the exit channels are likewise of relatively great significance for the shape or contour of the free form, so that when the valve is opened a particularly great surface change in the hollow section is produced, for example, in a wave form or peak form, which is precisely dependent on the number and form of the channels. In the case of a peak form, a positive lock on all sides is achieved, which also fixes the plastics material in rotation resistant manner on the hollow section.

In a further configuration of the invention, the expansion of the hollow section in the third step is ended if a specified residual volume of injection molding compound in the cavity is reached. This permits particularly simple monitoring of the progress of the method by measuring the volume of the plastics material emerging through the opened valve.

In a further embodiment of the invention, in a fourth step of the method the valve is closed and the internal high pressure of the hollow section is increased further. This means that additional calibration of the hybrid component and hence improvement of the material quality and the composite adhesion can be achieved.

The temperature of the injection mold is kept substantially constant during the entire expansion of the hollow section, in order to achieve as low as possible cooling of the injection molding compound, thus likewise to keep the temperature thereof constant and thus to maintain the desired effects on the flow limit of the material of the hollow section during the entire shaping process.

Preferably, when carrying out the method, a hollow section made from a deformable non-ferrous metal, preferably aluminum or an aluminum base alloy, is used. Precisely when using aluminum or aluminum base alloys, the aforementioned effects on the deformability due to temperature, shear stresses and back-pressure become particularly clearly noticeable, so that even with aluminum, which per se has low elastic limits, considerably greater degrees of deformation and hence a better positive lock between the hollow section and the plastics material portion can be achieved. Upon expanding the hollow section, in this case a maximum increase in diameter of 10% to 15% and in particular of 15% to 35% is achieved. This very considerably exceeds the degrees of deformation of 12% to 15% which are conventional for aluminum, so that even large undercuts between the metal and the plastics material portion can be achieved.

BRIEF DESCRIPTION OF THE DRAWING FIGURES

Figure 2:
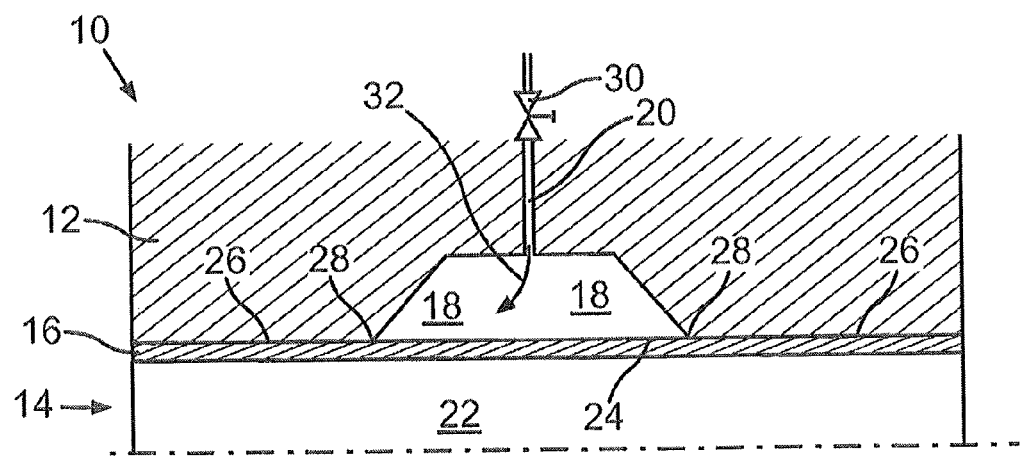
Figure 3:
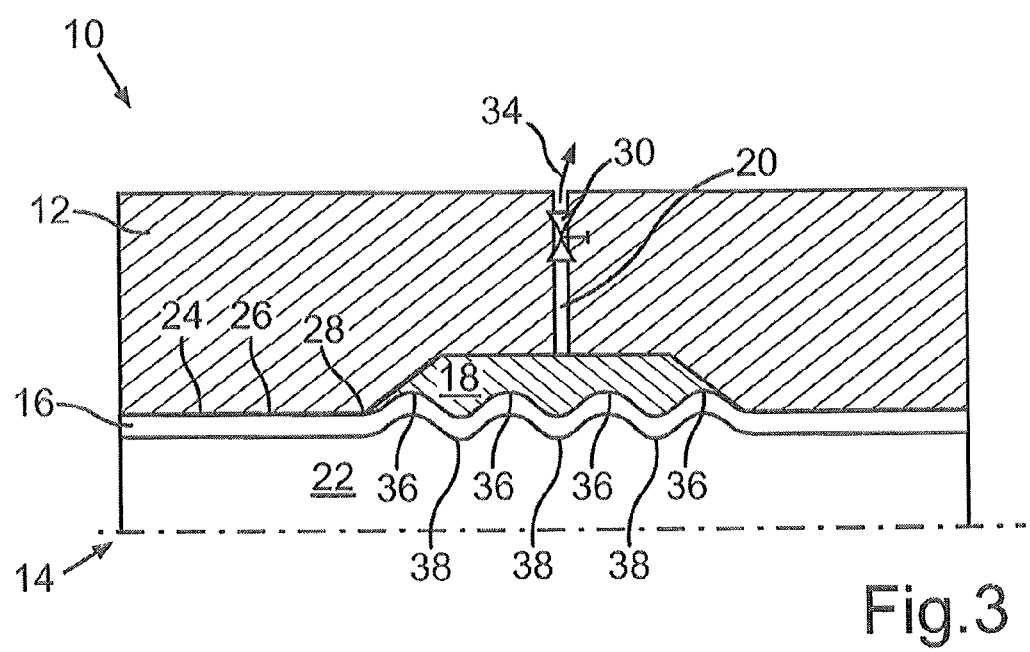

Below, the invention and its embodiments will be explained in greater detail with reference to the drawings. Therein:

FIG. 1 shows a diagrammatic sectional view through a combined hydroforming and injection mold with inserted hollow section for implementing a variant of the method according to the invention, FIG. 2 shows a mold and hollow section of FIG. 1 after the first method step, and FIG. 3 shows a mold and hollow section during the third method step.

DETAILED DESCRIPTION

A combined injection molding and hydroforming mold, referenced 10 overall, of which one half of the mold partial region 12 is illustrated in FIG. 1, comprises a central cavity 14 for receiving a hollow section 16 and also a sprue cavity 18 into which an injection molding compound, in particular a plastics material, can be fed through a sprue line 20.

FIG. 1 shows the mold 10 with the hollow section 16 prior to carrying out the method. To produce the composite component, initially the inner void 22 of the hollow section 16 is acted upon by a pressure, which expands the hollow section 16, until the outer wall 24 thereof comes to lie against the wall 26 of the cavity 14 of the mold 10, and optionally also expands slightly into the mold region 18.

In particular, this, as can be seen in FIG. 2, brings the edge region 28 of the sprue cavity 18 into contact with the outer wall 24 of the hollow section 16. As soon as the outer wall 24 has come to lie against the edge region 28, the valve 30 in the sprue line 20 is opened and injection molding compound is fed into the sprue cavity 18 in the direction of the arrow 32. The injection molding compound at this moment is at a temperature between 200° C. and 400° C. When carrying out the method, both the internal high pressure in the inner void of the hollow section 16 and the pressure of the injection molding compound in the sprue cavity 18 are monitored, so that a pre-set pressure curve occurs across the hollow section 16.

Due to the shear stresses exerted on the outer wall 24 of the hollow section 16 upon the injection molding compound flowing into the sprue cavity 18, the pressures acting on both sides of the outer wall 24 and the high temperature of the injection molding compound in the sprue cavity 18, the yield stresses are reduced and hence the flow behavior of the material of the hollow section 16 is improved, so that considerably higher degrees of deformation on the hollow section 16 become possible at this moment in the method.

This is exploited in the next method step, as can be seen in FIG. 3. Once the sprue cavity 18 has been completely filled with injection molding compound, then the internal high pressure in the internal void 22 of the hollow section 16 is increased further, the valve 30 remaining opened. In the region of the sprue cavity 18, the outer wall 24 of the hollow section 16 is expanded further, with injection molding compound being displaced out of the cavity 18 in the direction of the arrow 34.

Since the outer wall 24 of the hollow section 16 in the region of the sprue cavity 18 is not held back by the wall 26 of the injection mold 10, non-uniform expansion of the hollow section 16 is yielded in this region, as can be recognized in FIG. 3. In particular, a corrugated structure with wave crests 36 and troughs 38 is formed, which is mostly non-uniform. This yields a particularly durable positive lock between the injection molding material in the sprue cavity 18 and the hollow section 16 in the direction of the longitudinal extent of the hollow section 16. Optionally, in a next method step, the valve 30 can be closed, so that no further displacement of plastics material from the sprue cavity 18 can take place. Upon a further pressure increase in the inner void 22 of the hollow section 16, what is called calibration of the part occurs, which further improves the positive lock and the composite adhesion between the hollow section 16 and the plastics material in the sprue cavity 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of producing a composite component having a corrugated structure, in which a hollow section is expanded, at least in regions, by internal high pressure, comprising:
    a first step of expanding a region of the hollow section until the region lies against an edge region of a cavity of a combined hydroforming and injection mold;
    a second step, that begins after the first step has finished, of filling the cavity with an injection molding compound; and
    a third step, that begins after the second step has finished, of further expanding the hollow section into the cavity, at least in regions, which increases the internal high pressure, wherein
        in the third step, an increasing pressure expands the hollow section into the mold cavity thereby pushing back a still warm and formable compound material,
        during the further expansion in the third step a valve of at least one exit channel of the cavity is opened, so that the injection molding compound displaced by the expansion of the hollow section emerges from the cavity, and
        the corrugated structure has wave crests and troughs.

2. The method as claimed in claim 1, wherein the injection molding compound is filled in the cavity at a temperature from 200° C. to 400° C.

3. The method as claimed in claim 1, further comprising:
    setting, in the third step, a specified pressure difference between the internal high pressure and a pressure of the injection molding compound.

4. The method as claimed in claim 1, further comprising:
    ending the further expansion of the hollow section in the third step when a specified residual volume of injection molding compound in the cavity is reached.

5. The method as claimed in claim 1, further comprising:
    a fourth step of closing the valve, which further increase the internal high pressure of the hollow section.

6. The method as claimed in claim 1, wherein a temperature of the injection mold is maintained substantially constant during the first, second, and third step, such that the temperature of the mold is maintained substantially constant during an entire expansion of the hollow section.

7. The method as claimed in claim 1, wherein the hollow section is composed of deformable non-ferrous metal.

8. The method as claimed in claim 7, wherein the non-ferrous metal is aluminum or an aluminum base alloy.

9. The method as claimed in claim 1, wherein the further expansion of the hollow section in the third step causes the hollow section to have a maximum increase in diameter of 10% to 25%.

10. The method as claimed in claim 1, wherein the further expansion of the hollow section in the third step causes the hollow section to have a maximum increase in diameter of 15% to 35%.

11. A method of producing a composite component having a corrugated structure, in which a hollow section is expanded, at least in regions, by internal high pressure, comprising:
- a first step of expanding a region of the hollow section until the region lies against an edge region of a cavity of a combined hydroforming and injection mold;
- a second step of filling the cavity with an injection molding compound; and
- a third step of widening the hollow section into the cavity, at least in regions, which increases the internal high pressure, wherein
  - a temperature of the injection mold is maintained substantially constant during the first, second, and third step,
  - in the third step, an increasing pressure widens the hollow section into the mold cavity thereby pushing back a still warm and formable compound material,
  - during the widening in the third step a valve of at least one exit channel of the cavity is opened, so that the injection molding compound displaced by the widening of the hollow section emerges from the cavity,
  - the internal high pressure is increased after the cavity has been completely filled with the injection molding compound, and
  - the corrugated structure has wave crests and troughs.

12. The method as claimed in claim 11, wherein the injection molding compound is filled in the cavity at a temperature from 200° C. to 400° C.

13. The method as claimed in claim 11, further comprising:
- setting, in the third step, a specified pressure difference between the internal high pressure and a pressure of the injection molding compound.

14. The method as claimed in claim 11, further comprising:
- ending the widening of the hollow section in the third step when a specified residual volume of injection molding compound in the cavity is reached.

15. The method as claimed in claim 11, further comprising:
- a fourth step of closing the valve, which further increase the internal high pressure of the hollow section.

16. The method as claimed in claim 11, wherein the hollow section is composed of deformable non-ferrous metal, including aluminum or an aluminum base alloy.

17. The method as claimed in claim 11, wherein the widening of the hollow section in the third step causes the hollow section to have a maximum increase in diameter of 10% to 35%.

18. The method as claimed in claim 1, wherein the still warm and formable compound material is pushed back into valve controlled lines.

* * * * *